Aug. 29, 1967   F. BAUER ET AL   3,338,037
UNIVERSAL VEGETAL GRINDER AND HARVESTER
Filed Jan. 13, 1965   7 Sheets-Sheet 1

INVENTORS
FELIX BAUER
ROBERT FOLTIER
BY ⟨signature⟩
Agent

Aug. 29, 1967  F. BAUER ET AL  3,338,037
UNIVERSAL VEGETAL GRINDER AND HARVESTER
Filed Jan. 13, 1965  7 Sheets-Sheet 5

INVENTORS
FELIX BAUER
ROBERT FOLTIER
BY *Cal Thein* Agent

United States Patent Office 3,338,037
Patented Aug. 29, 1967

3,338,037
UNIVERSAL VEGETAL GRINDER AND HARVESTER
Felix Bauer, 87 Rue Moncey, Lyon 3me, France, and Robert Foltier, Le Bourdeau 38, Jonage, Ain, France
Filed Jan. 13, 1965, Ser. No. 428,012
Claims priority, application France, Oct. 14, 1964, 45,212; Dec. 5, 1964, 45,380
32 Claims. (Cl. 56—24)

The present invention relates to a universal vegetal grinder and harvester, and more particularly to an apparatus of this type which is adaptable to a multitude of terrains, tasks and applications, as will be explained in full detail as the description proceeds.

Hitherto known grinders usually have a single rotor with an axis which is, almost without exception, parallel with the terrain. The rotor beams cannot be individually disassembled. The vegetation cut by the apparatus is ejected either directly by movement of the rotating rotor beams, or alternatively by way of an Archimedean screw carrying the harvested and partly ground or chopped material to a turbine.

In hitherto known grinders, the working with high forage vegetation (like corn) requires a special attachment to the grinder, for guiding the vegetation parallel to the rotor axis; or, a special apparatus is required altogether for processing corn.

Under no circumstances are present-day grinders suitable to be used for working on hedges for which usually special cutting bars, discs or chains are needed; also, rotating discs are sometimes employed which have beams attached thereto, usually of an open construction. These devices are rather dangerous to operate, and furthermore require other implements or apparatus for removing the cut portions of the vegetation which are left in place by all the various known machines.

It is the object of the present invention to provide a novel type, entirely universal grinder and harvester suitable for practically all terrains, vegetals and applications, and which does not present the drawbacks of hitherto known structures.

It is another object of the invention to provide a grinder arrangement wherein a more thorough processing of the vegetation can be accomplished by at least two rotors moving in the same sense but at different speeds. The rotors are fitted with beams and paddle-shaped members; it is an object of the invention to provide an energetic ventilation by means of these paddle members, aiding in the discharge of the harvested and cut materials.

It is yet another object to make the rotor beams articulated so as to give way to hard objects, or hard vegetation, encountered during rotation. The rotor which has first contact with the vegetation is preferably larger than the second processing rotor, and it rotates at a slower speed with a view to diminishing the danger of accidental damage to the rotor beams.

It is a further object to provide mating recesses and projections in the free ends of the rotor beams, performing the cutting and chopping of the vegetation which has been severed by the first rotor.

It is yet a further object of the invention to provide safety means against accidental dislocations of the rotor beams, by the provision of arched grill blades, also adapted to act as cut limiting members. The harder the vegetation is, the smaller particles will be cut off so that the homogeneity of the ground product is assured. It is also an object to make the grill blades hinged, so as to allow easy access to the inner rotor portions, e.g. for cleaning purposes.

The second rotor, according to the invention, is smaller and rotates at a higher speed. It is another object to provide this rotor with specially shaped paddle members for vehemently entraining the surrounding air and, thus, the cut vegetals inside the hood.

It is still another object to provide journaling means for the rotor beams, which hold them in place against the effects of centrifugal forces during rotation, while allowing some movement toward the rotor shafts and also angular pivoting around the journaling means.

A further object of the invention is to allow the rotor beams to be put optionally in continuous or discontinuous alignment. This can be done on at least one rotor, namely the larger first rotor which contacts the vegetation while still in the soil. The latter set-up makes for a non-simultaneous attack on the processed material, and also ensures a uniform load distribution on the beams of the second rotor which are in a continuous line.

A still further object relates to the provision of an elastic coupling between the rotor drives, so as to absorb sudden jolts, protect the device and its drive mechanism, and reduce untoward vibrations.

It is also an object of the invention to allow the general axis of the universal grinder to be pivoted; viz, (a) at any desired angle, in a vertical plane perpendicular to the direction from where the vegetation enters; and (b) either forwardly or rearwardly, in a vertical plane parallel to the same direction of entry. The grinder can thus be adapted to both low and high type of vegetation since it works equally well in horizontal and vertical positions, or at any intermediate angle. The grinder is also capable of following various terrain undulations where a really universal machine may be put to work.

Yet another object relates to the way in which the rotor beams can be easily mounted and dismounted so that they can be exchanged individually or in sets for the various tasks of chopping, grinding with rigid beams, or squashing with soft beams. The grinder can, therefore, also be used for splitting or breaking into small pieces various types of forage.

Further objects relate to the possibility of attaching removable accessories, like sharp combs which aid in cutting the vegetation, or appropriately shaped deflectors, e.g. for assisting in feeding soft and light-weight vegetation into the grinder. Alternately, a deflector type may be used which is adapted to vegetation that is perpendicular to the ground.

Finally, the objects envisaged by the invention include attaching means for connecting the universal grinder to the conventional three-point attachment of a tractor; drive means for connecting the grinder to the power take-off of said tractor; Cardan-type and gear-actuated drive means for operatively connecting the various rotating members to said take-off.

According to one of the most important features of the invention, the universal grinder has at least two rotors with parallel axes, with sizes and speeds as mentioned before; each rotor has articulated beams and paddle members, the former being preferably continuous on one rotor and adjustably discontinuous on the other. During the unidirectional rotation of the rotors, the beams interpenetrate with the afore-mentioned recesses and projections, while the vegetation is being caught and cut therebetween.

According to another feature, the ends of the rotor beam axes are journaled in fixed lodgments rigid with the rotors and open toward their axes. Cross-pieces provided between the rotor and beam axes are not subject to dynamic strain; their locking and unlocking can be effected by hand.

Another feature of the invention relates to the provision of a protective grill surrounding the first rotor which is in contact with the vegetation before being cut or removed from the soil. The rotating beams are allowed to protrude beyond the grill. There is at least one arch in the grill per crown or line of rotor beams.

Yet another feature of the invention provides a wheel opposite to the pivoting grinder portion for supporting the same in an angular position, e.g. on a sloping terrain. The wheel is removably attached to a tubular member rigid with the grinder mantle.

Still another feature of the invention allows exchangeable attachments to be used on the input side of the mantle or hood. Various deflectors for low and high (perpendicular) vegetation, combs with sharp blades for rough vegetation, etc., can easily be applied and removed.

The inventive universal grinder and harvester also features a Cardan-type connection to the power take-off of a tractor, a trapezoidal or similar belt drive, appropriate coupling elements, a gear-case, as will be described hereunder in full detail.

Finally, it is also one of the noteworthy features of the present invention that the chopped or ground material may be discharged from the grinder in any desired direction, owing to the provision of a swivable hood which ends in a tubular conduit or chopped-material discharge member. A collar is interposed and has concentric slits in which may be tightened appropriate bolts having winged nuts at their ends.

The various objects, features and attendant advantages of the present invention will become more apparent from the following description of a preferred exemplary embodiment of the universal vegetals grinder and harvester, when considered in conjunction with the accompanying drawings, wherein

FIG. 9a is a sectional view, taken along line 9a—9a of FIG. 9, and showing a coupling therein;

In the drawings, numeral 1 generally denotes an exemplary embodiment of the inventive universal vegetals grinder and harvester; 2 is a tractor to which grinder 1 is attached; 3 is forage or the like vegetation to be ensilaged; 4 denotes the approximate elevation of high hedges or parasitic vegetation; and 5 identifies brushwood and other low vegetation, to be handled by the universal grinder according to the invention.

In the detailed description of the inventive grinder which follows, due reference will be had to the figures in which the components are best illustrated.

Figure 1:
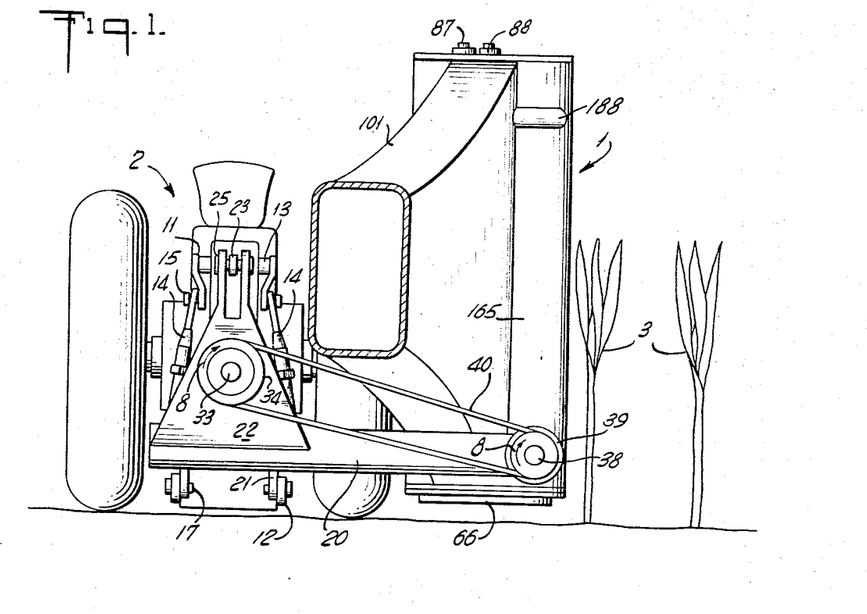
FIG. 1 is a rear view of the grinder, in its vertical position, also showing a portion of the tractor to which it is attached by means of the three-point attachment of the hydraulic mechanism, the hood of the harvester being cut away for a clearer illustration.
Figure 3:
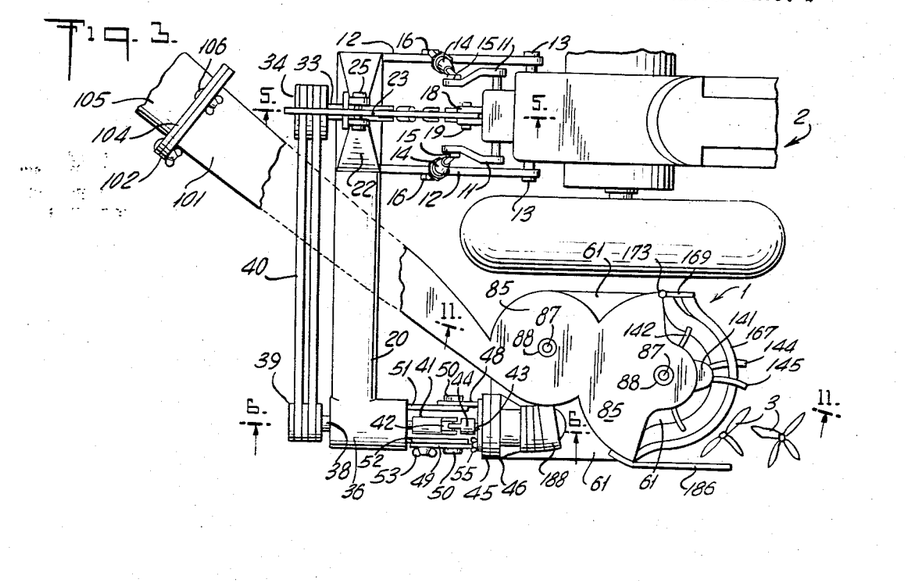
FIG. 3 is a horizontal plan view of the grinder according to the invention, similarly in vertical position, also showing part of the tractor and of the hood, and the standard power connection with the tractor.
Figure 4:
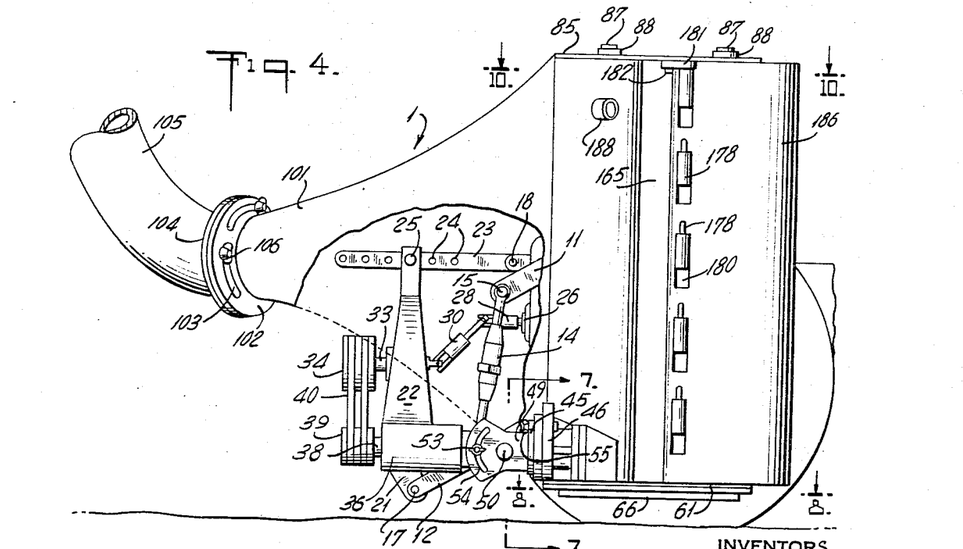
FIG. 4 is a side elevational view of the grinder, in the vertical position, also showing the three-point attachment and the power connection.
Figure 5:
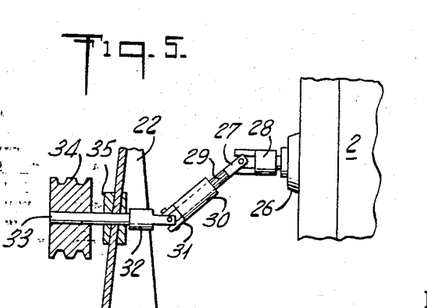
FIG. 5 is a lengthwise, vertical sectional view, taken along line 5—5 of FIG. 3, showing the connection between the tractor power output and the grinder drive input.

FIGS. 1, 3 and 4 illustrate a three-point attachment of a tractor 2, said attachment comprising a pair of connecting rods 11 which are in engagement with respective levers 12, each articulated on a pivot 13, by the intermediary of a longitudinally adjustable bar 14. The latter is pivoted to rod 11 by way of pivot 15, and to lever 12 by way of pivot 16. The ends of levers 12 opposite the pivots 13 are in engagement with fixing pivots 17 while a frame portion 18 of tractor 2 is engaged by a fixing pivot 19. The so-called three-point attachment is constituted by the aforementioned pivots 17 and 19.

The grinder 1 is supported on the tractor 2 by way of a beam 20 having rigid therewith a pair of brackets 21, connected to levers 12 by way of pivots 17, as well as a support 22 to which is attached an arm 23, having a plurality (e.g. six) holes 24, by means of a pivot 25. The end of arm 23 opposite the holes 24 is fixed to the tractor frame portion 18 with the pivot 19.

In FIGS. 1, 3 through 5 and 18, the drive input of the grinder is shown. The tractor 2 has a power output 26 to which the grinder is connected with a Cardan shaft 27 which has a coupling muff 28 provided with inner fluting and operatively engaging the corresponding outer fluting of the tractor output shaft 26. The shaft 27 has attached thereto a stem 29, preferably of rectangular cross-section, slidable in a coupling 30, similarly of rectangular cross-section, the latter being rigid with a Cardan joint 31. The latter has another coupling 32 attached thereto, which is keyed to a shaft 33 which carries a pulley 34, similarly keyed to shaft 33. The support 22 has a ball bearing 35 for shaft 33.

FIGS. 1, 3, 4, 6 and 7 show the drive mechanism proper. At the end of the beam 20 which receives the support 22, another support 36 is provided which has therein a pair of bearings 37 for journaling a shaft 38 to which is keyed a pulley 39. The latter is interconnected with the previously described pulley 34 by way of a belt 40, preferably V-shaped or trapezoidal in cross-section. The end of shaft 38 opposite the pulley 39 is keyed to a coupling 41 which forms part of a Cardan joint 42. This joint is keyed to a shaft 43 by way of a coupler 44.

It should be noted that a preferred embodiment of the drive mechanism has a pulley 34 with a diameter of 300 millimeters, while the drive pulley 39 has a diameter of 200 mm.; the respective speeds are 540 and 810 revolutions per minute, in case of a conventional tractor power output, as shown at 26.

Figure 6:
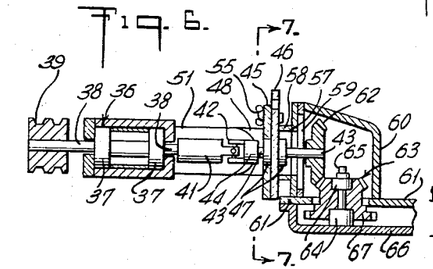
FIG. 6 is another lengthwise, vertical sectional view, taken along line 6—6 of FIG. 3, illustrating the connection between support and grinder.
Figure 7:
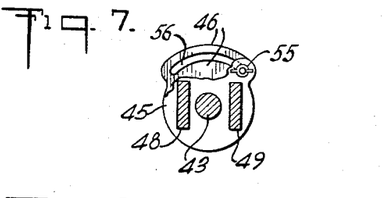
FIG. 7 is a transversal sectional view, taken along lines 7—7 of FIGS. 4 and 6, of the support and grinder connection.

Shaft 43 passes through outer and inner cheek plates 45, 46, respectively, each having a bearing 47. The plate 45 has two cross plates 48, 49 which are pivoted at 50 to respective beams 51, 52 which are held by support 36. The common axis of pivots 50 coincides with the axis of Cardan joint 42; beam 52 has a threaded bore adapted to receive a bolt 53 which passes through a slit 54 of cross plate 49, said slit being concentric with the aforementioned axis of pivots 50.

Figure 2:
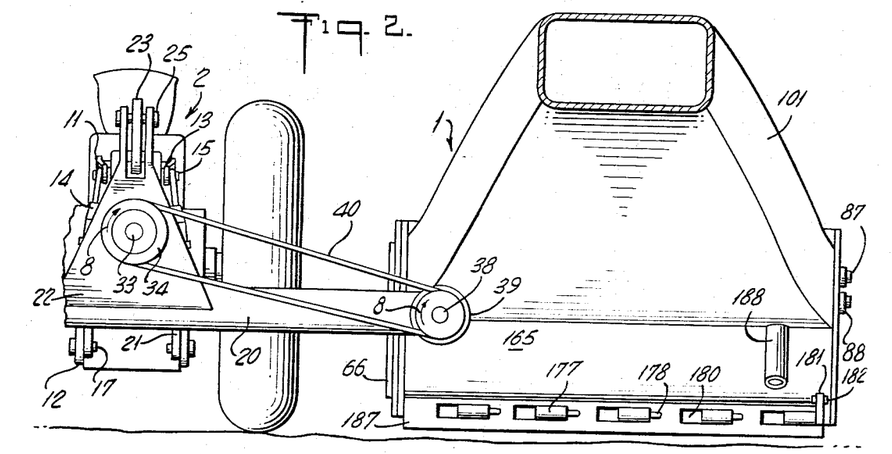
FIG. 2 is a rear view similar to FIG. 1, but with the structure in the fixed horizontal position, only part of the tractor being shown and the hood being partly cut away.
Figure 18:
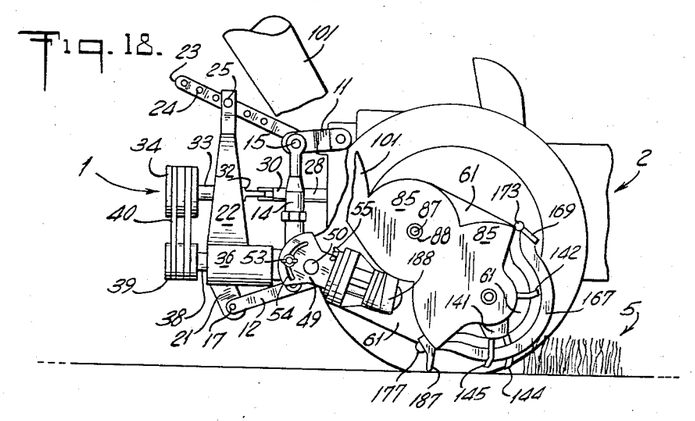
FIG. 18 is a side elevational view of the grinder, similar to FIG. 4 but with the structure in the fixed horizontal position, portions of the hood and the tractor wheel being removed for a better showing of the hydraulic mechanism.

As will best be seen from FIGS. 6 and 7, the inner cheek plate 46 is rotatable with respect to shaft 43. Plate 45 has a threaded bore adapted to receive a bolt 55 which passes through a slit 56 of plate 46, said slit being concentric with shaft 43. The rotation of plate 46 can be immobilized by means of said bolt 55, the latter being adapted to be tightened against the face of the outer cheek plate 45. FIG. 7 corresponds to the vertical position of the grinder, as shown in FIGS. 1 and 4, for example; by moving inner plate 46 in clockwise direction, as viewed in FIG. 7, the entire grinder 1 can be tilted to the slanting position of FIG. 19, and further to the horizontal position, as shown in FIGS. 2 and 18.

The cheek plate 46 is secured to a cover 57 by the intermediary of a connecting member 58. Cover 57 is bolted to the opening 59 of the gear-case 60 attached to a stationary lower plate 61 of grinder 1.

The end of shaft 43 oppoiste to coupler 44 has keyed thereto, inside gear-case 60, a conical pinion 62. The latter entrains another conical pinion or gear 63 journaled in two conical bearings 64 which are mounted on a shaft 65, the latter being fixed to a gear-case portion 66 of the drive mechanism, and which is bolted to the lower plate 61. The hub of pinion 63 is held in plate 61 by the lower one of bearings 64 and has a lower, toothed profile 67 for driving a chain 63a, shown in FIG. 8. The chain entrains two gears, namely 68 and 69, to be described hereunder in detail.

Figure 8:
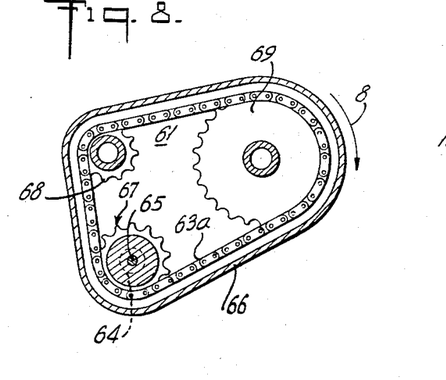
FIG. 8 is a horizontal sectional view, taken along line 8—8 of FIG. 4, showing the gear-case of the rotor driving mechanism on a somewhat enlarged scale.
Figure 8A:
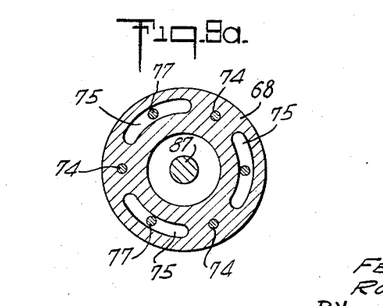

Further to the description of FIGS. 6 and 8, it should be noted that, according to a preferred exemplary embodiment of the inventive universal grinder and harvester, conical pinion 62 has 36 teeth while the conical gear 63 driven thereby has only 18 teeth. Furthermore, the profile 67 (rigid with gear 63) has 46 teeth, while the gears 68, 69 (driven by the intermediary of chains 63a) have 25 and 95 teeth, respectively.

Figure 9:
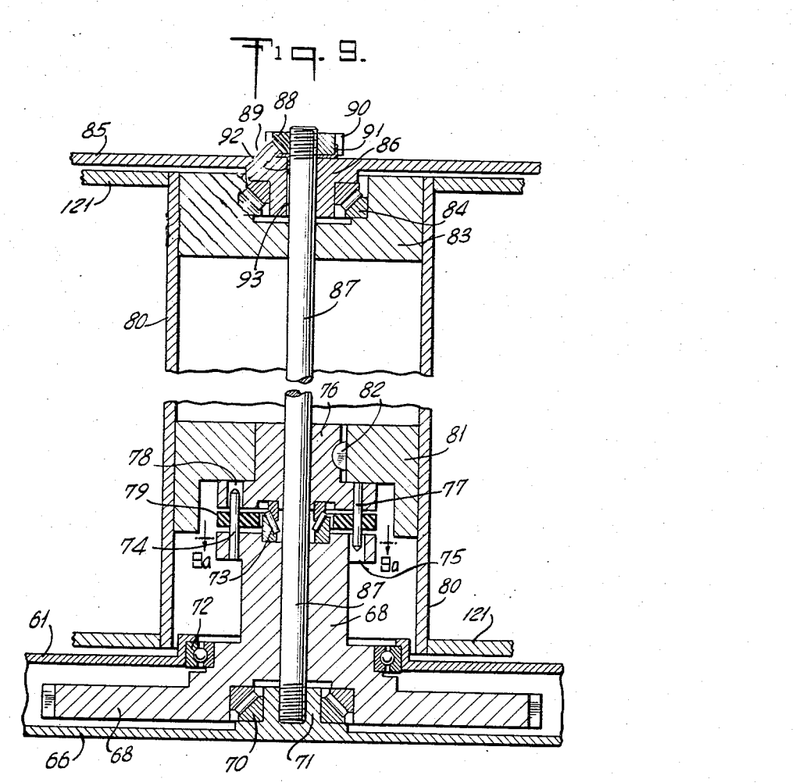
FIG. 9 is a sectional illustration showing two end portions of one of the rotor axes, with the resilient connection of the drive mechanism as well as the mounting between the lower and upper supporting plates of the grinder.

On a somewhat enlarged scale, FIG. 9 shows how the gears 68, 69 (only the former being illustrated) rotate between conical bearings 70 held on the gear-case portion 66 by way of an embossment 71 and a bearing 72 fixed to the lower plate 61. A central depression provided in the upper hub portion of gear 68 receives the bottom portion of a conical bearing 73. Symmetrically around the gear hub circumference, fingers 74 are attached and, between them, arcuate slots 75 are provided. Coaxially with gear 68 and bearing 73, there is a central member 76 which has a central depression similar to that of gear 68 so as to accommodate the bearing 73. At a radial distance identical with that of fingers 74 and slots 75, the member 76 also has fingers 77 attached thereto and slots 78 provided therebetween. It will be seen that fingers 77 have a play in slots 75 concentric with gear 68 and member 76; similarly, fingers 74 may move relative to slots 78.

Reference should also be had to FIG. 9a which is a transversal sectional view of FIG. 9, across the upper hub portion of gear 68, slightly below the conical bearing 73. The disc-shaped top of the upper hub portion of gear 68 is substantially parallel with the disc-shaped bottom of the central member 76.

In the space provided by the respective depressions of gear 68 and central member 76, an annular disc 79 is loosely applied around bearing 73. The disc 79 is made of a soft material (e.g. felt) or preferably of hard rubber or the like, and has therein appropriate round holes for both finger groups 74, 77; its inner aperture is slightly larger than the outer diameter of bearing 73. The holes of disc 79 for the finger groups 74, 77 will efficiently brake any rotational slip, torsion or other unwanted movement between the coupled elements 68 and 76. The concentric system is surrounded by a tubular member 80 which has, in one peripheral region around member 76, a hub 81 welded or otherwise secured therein. The hub 81 symmetrically surrounds member 76 and has at least one pin 82 which protrudes into an appropriate depression of member 76 so as to immobilize the same with respect to member 80.

The other peripheral region of tubular member 80 has another hub 83 secured therein for supporting a conical bearing 84 similar to bearing 70 at the bottom end of member 80. The bearing 84 is fixed to a stationary plate 85 of the grinder around an inner embossment 86. The embossment 71 has a threaded bore into which is screwed a stationary stem 87 which protrudes beyond plate 85 upon having concentrically traversed, with a slight play, the aforementioned elements, viz gear 68, end bearing 73, member 76, hub 83 and embossment 86, all this inside the full length of tubular member 80.

From the stationary arrangement of plates 61 and 85, as well as of stem 87 it follows, of course, that there is some play around said stem 87 for the rotation of gear 68, bearing 73, member 76 and hub 83, although no gap has been shown in FIG. 9, for the sake of clarity. Embossment 86, being part of the upper plate 85, is stationary.

The upper portion of stem 87 which protrudes beyond embossment 86 and plate 85 is threaded for receiving a nut 88 under which a washer 89 is placed, on top of plate 85; nut 88 preferably has grooves 90 for receiving one or more teeth 91 of said washer 89. The latter also has an inner tongue 92 which fits into an inner groove 93 of the embossment 86, inside the bore provided for the passage of stem 87. Upon having completed the assemblage of the gears 68 or 69 with their respective rotors (to be described hereunder), and having adjusted the proper play between the co-operating elements, one of the teeth 91 is turned down on the corresponding groove 90.

It should be noted, as has been pointed out before, that the structure of the gears 68 and 69 is essentially identical except for the number of teeth as can clearly be seen from FIG. 8 where this number and, consequently, the respective rotational speeds, of gears 68, 67 and 69 approximately correspond to the ratio of numerals 5, 7 and 11. In consideration of the diameters and rotational speeds of pulleys 34, 39, the gears 63, 67 will both make 1620 r.p.m., and the driven gears 68, 69 will rotate at 2980 and 784 r.p.m., respectively. Another small difference between the gear structures resides in the respective cheeks rigid with both ends of the respective tubular members 80, as will be explained hereafter.

For the understanding of FIGS. 10 and 11 to be described in the following, it should be noted that the sense of rotation is indicated by numerals 8 throughout the various views and sections. For the sake of clarity, the following elements have been omitted from the sectional view of FIG. 11: framework, cut limiting safety assembly (for which see FIG. 15), rotor shafts, drive mechanism and resilient coupling of the latter with the rotors.

The tubular members 80 described hereinabove constitute the shafts for grinder rotors generally designated 120 and 140. The former is fitted with cheeks 121 and paddle-shaped members 122, while the latter has cheeks 141 and paddle members 142. The members 80 have both the same length; however, on rotor 140, all the cheeks 141 are uniformly spaced, throughout the entire length, while on rotor 120, the cheeks 121 have generally the same distances between adjoining pairs as those between all pairs of cheeks 141, with the exception that the second cheek and the second from the end are only at half the distance of the oppositely arranged pairs of cheeks 141 (first and second, as well as last and the one before last, respectively), substantially as illustrated in FIG. 11. Consequently, the total number of cheeks 121 is higher by one than that of cheeks 141; at both ends of rotor 120, there is half a space only while rotor 140 is uniform in its spacing.

The spaces between the cheeks 121 accommodate longitudinal shafts 123 for beams 124 while the half spaces, at the ends of rotor 120, accommodate shorter shafts 126 for narrower beams 127. In a similar manner, the spaces between all the cheeks 141 accommodate shafts 143 for beams 144 as well as similar beams 145. In a longitudinal sense, around the respective axes of rotors 120 and 140, the shafts 123 and 126 are arranged so as to form the corners of a triangle, with their beams 124 and 127, respectively, in three symmetrical lines; the shafts 143, on the other hand, are arranged in two groups of three symmetrical lines each, one group comprising the beams 144 while the other includes, in an angularly spaced-apart relationship, the beams 145. The relation of the two groups is shown in FIGS. 10 and 12.

Figure 12:
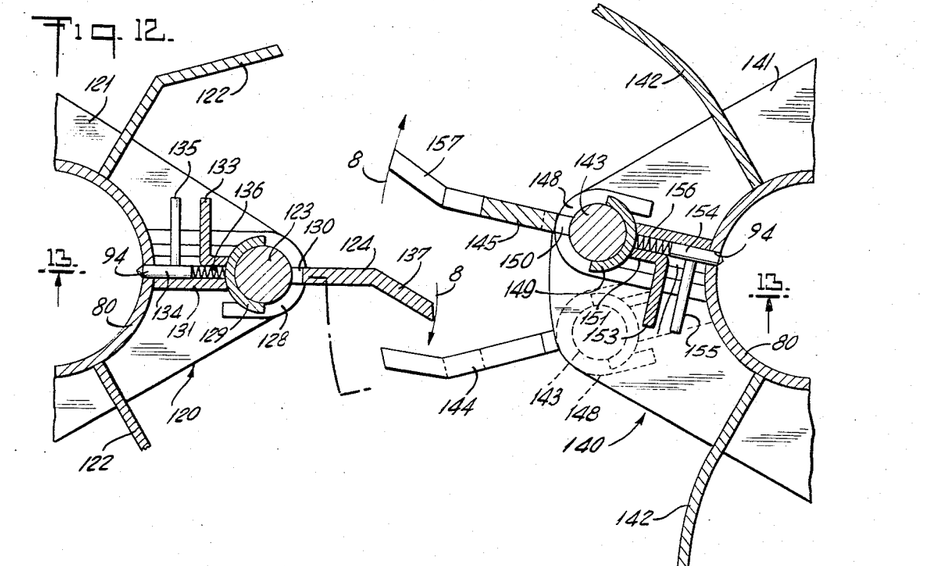
FIG. 12 is a partial horizontal sectional view similar to that of FIG. 10, but on an enlarged scale, illustrating the mutual interpenetration of one rotor beam with the other, this view corresponding to a section taken along lines 12—12 of FIGS. 11 and 13.
Figure 13:
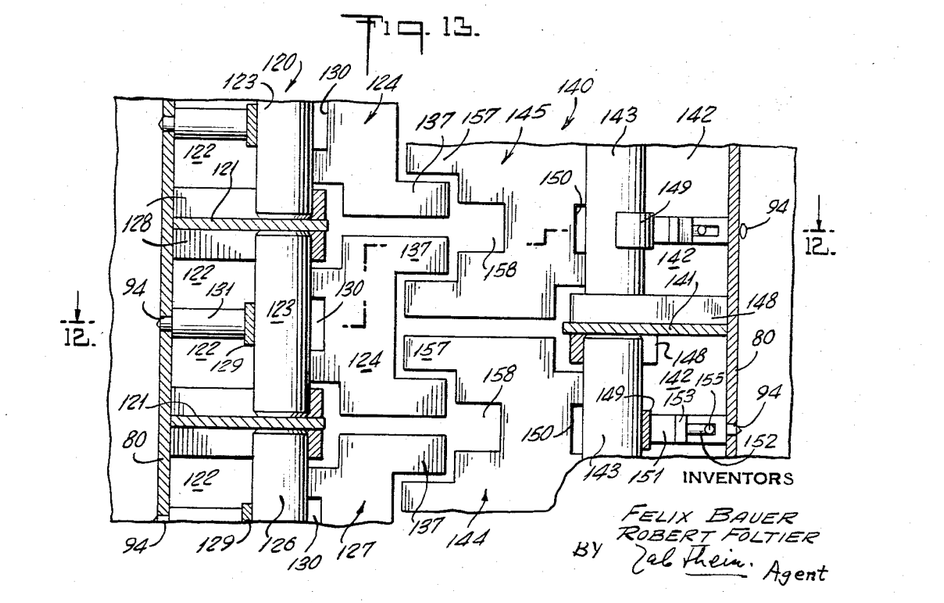
FIG. 13 is a partial vertical sectional view similar to that of FIG. 11, but on an enlarged scale, and taken along line 13—13 of FIG. 12, of the elements shown in the latter, and also illustrating the locking mechanism of the rotors.

FIGS. 12 and 13 illustrate the structural details of the rotor beams. Both faces of the cheeks 121, 141 carry respective lodgments 128 and 148, of which the former are in three symmetrical lines while the latter are in two groups of three lines. On their outer faces, the very last cheeks of both rotors do not have lodgements. The shafts 123, 126, 143 are pivotally held between pairs of lodgements 128, 148, respectively, and have the respective beams 124, 127 as well as 144, 145 attached thereto. As will be clear from the following explanation of the associated structure, the shafts are not only free to pivot with respect to the lodgements but can also move inwardly, that is toward the respective tubular members 80, without freedom of movement in outward direction, that is, away from the members 80.

The inward movement of the shafts 123, 143 is limited by movable restraining structures arranged between said shafts and the corresponding members 80. The restraining structure comprises, in the two rotors and for each aforementioned lodgement thereat, half-collars 129, 149 for the respective shafts 123, 126 and 143, with appropriate clearances 130 provided in the beams 124, 127 and clearances 150 in the beams 144, 145. Tubes 131, 151 having slits 132, 152 and brackets 133, 153 attached to them are connected with the respective half-collars 129, 149.

The tubular members 80 have bores 94 therein for each beam structure, into which protrude the inner ends of stems 134, 154 which are slidable within the tubes 131, 151, respectively. To the stems are attached brackets 135, 155 adapted to pass through the slits 132, 152. Inside the tubes 131, 151, compression springs 136, 156 are interposed between the outer ends of stems 134, 154 and the inner faces of half-collars 129, 149.

Figure 10:
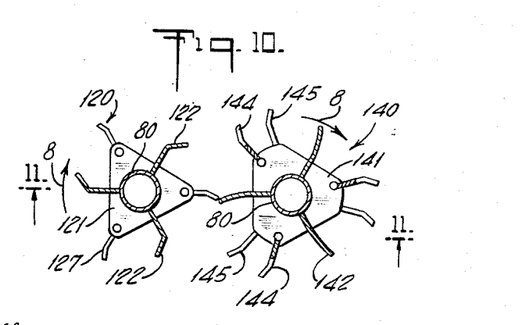
FIG. 10 is a horizontal sectional view, taken along lines 10—10 of FIGS. 4 and 11, showing two grinder rotors with their beams, the framework of the grinder and the bolts of the rotor beams being omitted for the sake of clarity.
Figure 11:
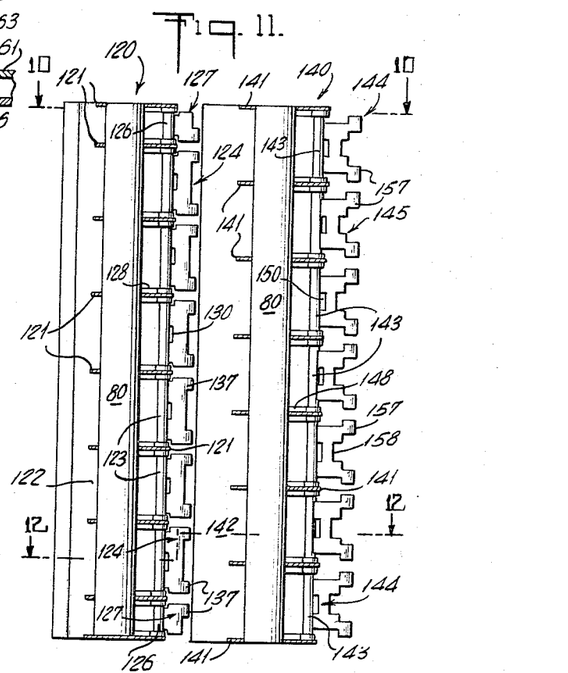
FIG. 11 is a lengthwise, vertical sectional view, taken along lines 11—11 of FIGS. 3 and 10, of the rotors with their beams, but with some parts of the structure omitted.

It should be noted that the restraining structure described hereinabove in connection with FIGS. 12 and 13, and comprising the elements 129 and 131–136, as well as 149 and 151–156, for the respective rotors 120, 140, have been omitted from FIG. 11 for the sake of a clearer illustration; similarly, FIG. 10 is a simplified version of FIG. 12, without showing the aforementioned elements of the restraining structure.

The beams 124, 127 have projections 137 and the beams 144, 145 have similar projections 157, reciprocally interpenetrating between the opposite beams, as can be seen in FIG. 13. The beams 144, 145 also have notches 158 at the bottoms of the clearances 150 which allow the projections 137 to pass therebetween. The extremities of the paddle-shaped members 122 describe a diameter which is smaller than the one in tangential relation to the diameter described by the extremities of the projections 157; similarly, the extremities of the paddle members 142 move along a circular path smaller than the one tangential to the path described by the extremities of the projections 137.

Figure 14:
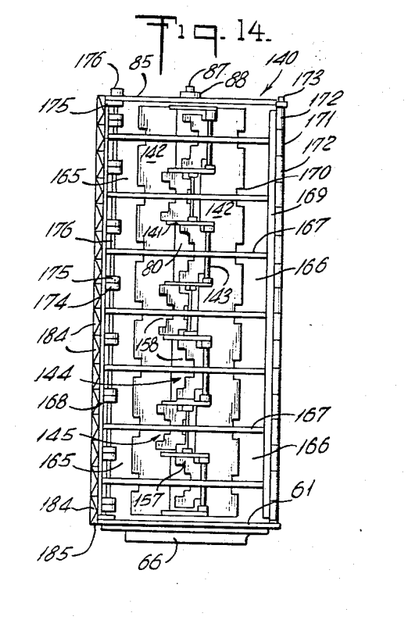
FIG. 14 is a frontal profile view of the grinder in its vertical position.
Figure 15:
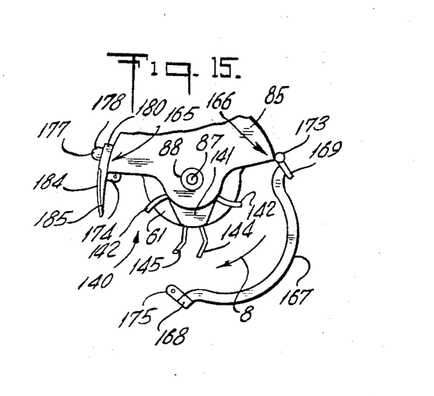
FIG. 15 is a partial plan view of the grinder, showing the cut limiting safety assembly, in an open position.
Figure 16:
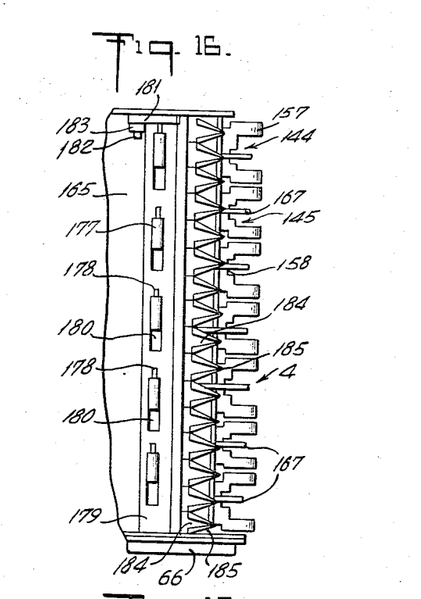
FIG. 16 is a partial elevational view of the grinder in the vertical position, showing the comb with sharp teeth turned aside for handling tough vegetation.
Figure 17:
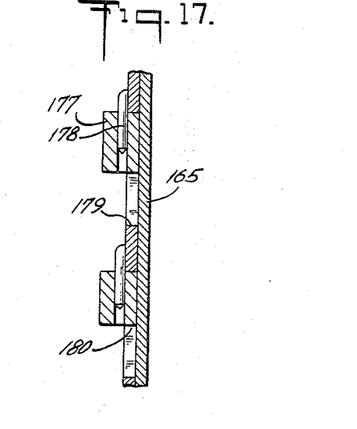
FIG. 17 is a sectional view showing a portion of the stopping elements of the comb and the deflectors, operative in the vertical, as well as the fixed and free-floating horizontal positions of the grinder.

Further structural details of the novel universal vegetals grinder and harvester will be described with reference to FIGS. 2–4 and 14–20. More particularly, FIGS. 14–16 show that around rotor 140 there are mantle portions 165, 166 while the opening therebetween is fitted with a grill consisting of blades 167 attached to uprights 168, 169. In FIG. 15, the above-mentioned grill structure is shown in an opened position, with upright 168 detached. The blades 167 are curved and are adapted to pass through notches 158 when the rotor 140 is in movement so that the projections 157 extend outwardly beyond the grill. Paddle members 142 also have notches 170, similar to notches 158 of the associated beams 144, 145; the blades also pass through these notches 170, allowing the paddle members 142 to protrude outside the grill while they rotate.

The upright 169 has hinges 171 articulated to corresponding members 172 secured to the edge of the mantle portion 166 by way of a bar 173. The edge of the mantle portion 165 has paws 174 secured to its inner side, similar to paws 175 secured at appropriate locations along the upright 168. These paws are in closely adjacent relationship and have registering apertures therein for passing a removable bar 176 therethrough. The edge of the mantle portion 165 has embossments 177 secured to its outer side, the embossments having apertures therein for receiving fingers 178 attached to a plate 179 which adjoints mantle portion 165. Plate 179 has recesses 180 therein which correspond to the embossments 177 but are somewhat longer by more than the free length of the fingers 178. When the latter engage the apertures of embossments 177, plate 179 is immobilized by a stop member 181 pivotable around a pin 182 which passes through an embossment 183, also shown in FIG. 4.

The grinder 1 has a set of interchangeable plates 179 fitted either with triangular knives 184 sharpened on their free sides 185, as shown in FIGS. 14 through 16, or with a deflector 186, as illustrated in FIGS. 3 and 4, or alternatively, with a different deflector 187, as applied to FIGS. 2 and 18 through 20.

The mantle portion 165 also has a tube member 188 (see FIGS. 18–20) for receiving a pivot 189 to which is attached a fork member 190 provided to hold a wheel 191 the axis of which is spaced apart with respect to that of pivot 189.

Behind rotor 120, opposite the opening covered by the grill comprising the blades 167, the mantle portions 165, 166 are prolonged by a hood 101 which ends in a circular opening having a collar 102 (FIGS. 3 and 4) which has concentric slits 103. Next to the collar 102 there is another similar collar 104 which ends in a tubular conduit or discharge member 105. The latter can be rotated to any desired position, and immobilized thereat, by means of bolts 106 screwed into collar 104, passing through the slits 103 and winged or other heads adapted to be tightened upon having directed the member 105 into the desired direction.

It is believed that the preceding structural description covers all important technical details of the novel apparatus, and makes the various operational modes self-explanatory. However, a few operational details will be explained hereunder in more detail.

Figure 19:
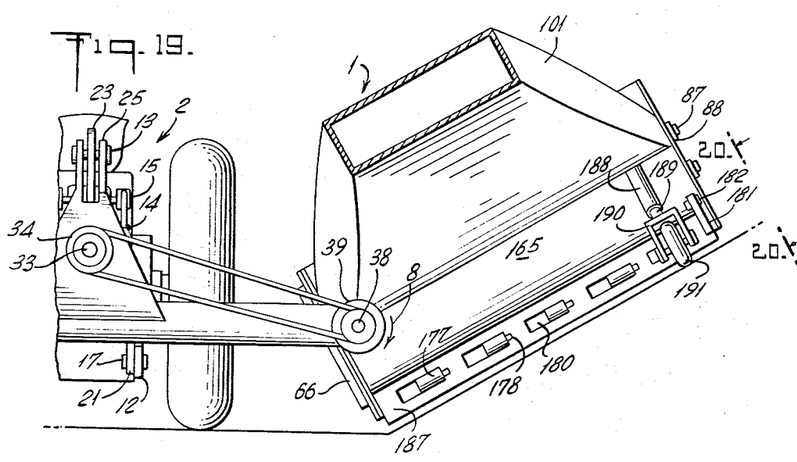
FIG. 19 is a rear view of the grinder, similar to FIGS. 1 and 2, but with the structure in the free-floating horizontal position, e.g. for use on sloping terrain, showing the pivoting wheel in its activated position.
Figure 20:
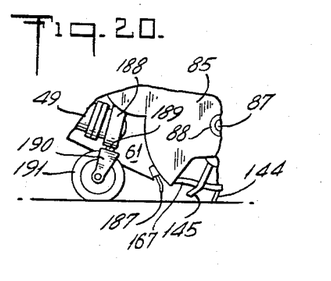
FIG. 20 is a partial side elevational view, taken along line 20—20 of FIG. 19, showing the pivoting wheel mechanism.

The first rotor to attack the vegetation is rotor 140, which is larger but rotates at a slower speed than rotor 120, the second in sequence to handle the partly cut or ground vegetation portions. The speed ratio of the rotors will be clear by referring to FIG. 8. In FIGS. 10, 11 and 16, the vegetation enters from the right-hand side, much like the arrangement shown in FIG. 1. The latter, together with FIGS. 3, 4, 14 and 16, shows the grinder and harvester set for operation in a vertical position, for substantially upright vegetation perpendicular to the ground; FIGS. 2 and 18 show the apparatus in its fixed horizontal position, for low vegetation; and finally, FIG. 19 illustrates the arrangement for a so-called free-floating condition, suitable for handling low vegetation on a slope.

FIGS. 4 and 7 best illustrate the two adjusting systems for pivoting or tilting the rotor assembly in two directions at right angles with respect to one another. FIG. 6, and more particularly FIG. 7 show the structure adapted to tilt the rotor assembly between the aforementioned vertical and horizontal positions, by means of bolt 55 passing through an arcuate slot covering approx. 90° movement. The position shown in FIG. 7 corresponds to the horizontal rotor position; for pivoting the rotors into the vertical position, plate 46 and the gear-case as well as the rotor structure associated therewith have to be swiveled in counter-clock sense, as viewed in FIG. 7. In both end positions, as well as in any optional intermediate position, the adjacent plates 45, 46 may be immobilized by tightening said bolt 55. The free-floating rotor position results when the bolt is loose, allowing the rotor assembly to follow the terrain undulations on its own. Wheel 191 should be attached for this mode of operation.

FIGS. 4 and 18, on the other hand, show the second structure for swiveling the rotor assembly forwardly and rearwardly, in a manner entirely independent from the aforementioned tilting. In this case it is the bolt 53 which can be tightened, at any location along arcuate slot 54 of plate 49, so as to allow the latter to be swiveled together with the gear-case and rotor assemblies rigid therewith. When the rotors are vertical, the swiveling adjustment makes for varying the angle of attack with respect to the vegetation (e.g. corn) to be harvested; when they are horizontal, the relative position of the rotors with respect to the terrain and the vegetation can be set, as will be apparent from the angularly displaced setting shown in FIG. 18. This adjusting system is not used in a floating condition, with bolt 53 untightened.

The tractor 2, together with the universal grinder 1 secured to it, moves toward the right-hand side of the views of FIGS. 3, 4 and 18. The detached, cut and chopped vegetation is deposited behind the machinery, by means of adjustable discharge member 105 (see FIGS. 3 and 4). This can, of course, be behind the tractor, the grinder, or even sideways (to the left-hand side of the direction in which the tractor progresses).

It will be understood by those skilled in the art that the inventive grinder and harvester has been shown in an examplary way for attachment to the right-hand side of a tractor so as to handle vegetation on the same side of the path. The same structure, embodying identical features and details, can, of course, be provided for left-hand attachment, if this should prove desirable. For idling passages, when the grinder does not have to operate, it is preferably tilted into the vertical position shown in FIG. 1 so as considerably to reduce the total width of tractor and grinder (as evidenced when comparing FIGS. 1 and 2, e.g. between the right-hand tractor wheel and the outermost edge of the grinder).

It may be added at this point that although a direct drive connection has been shown between the tractor power output 26 and the rotor assembly, clutch and/or speed change means may at will be intercalated in the drive train, if, for example, the rotational adjustment of the tractor power output should prove insufficient for providing specifically slow or fast speeds, for very tough or very soft vegetation, respectively. Such means being conventional in the art, no further illustration or explanation is deemed to be necessary.

The grinder according to the invention does not require ventilators, conveyors or other conventional expedients of air whirling and material transportation, since the paddle-shaped members 122, 142 of the rotors perform this combined task. FIGS. 14 and 15 best illustrate how the vegetation, approaching, as it would, from the bottom of the drawing, is forced against plates 179 having the knives 184 thereat, and from there along mantle portion 165 and toward the inner rotor. The simultaneous rotation of outer rotor 140 and inner rotor 120 at different speeds, coupled with the different radial extensions of beams 124 and 144, 145, results in a combination of peripheral speeds which makes for most efficient and balanced chopping of the vegetation between the beam edges, notches and projections, as has been described hereinabove.

The two sets of rotor beams 144, 145 can be set to a simultaneous attack, in a single continuous line, and to an operation spaced apart with respect to both unit of time and space, in a discontinuous line or rather two adjacent, separate lines. This feature has been shown with regard to rotor 140 alone, although, it will be understood, both rotors or the rotor 120 alone may be given this expedient.

The discontinuous alignment, although not illustrated in particular, will now be further explained with reference to FIG. 12 wherein details of the structure are illustrated for this purpose. Beam 145 of rotor 140 has been shown with its lodgment 148 and the associated elements 149–156. These elements may be provided on both sides of cheeks 141 (except, of course, the outer sides of the terminal cheeks, as seen at the top and the bottom of FIG. 11), as shown in FIG. 12 in broken lines, for beam 144 which, behind the afore-mentioned beam 145, is in a discontinuous alignment. Although the two sets of lodgments (the ones in solid lines and those in broken lines) are shown at a certain angle with respect to each other, it will be understood that they may be axially behind each other or in another angular relation (e.g., symmetrically alternating around the cheeks 141).

For relatively weak or soft vegetation, the beams 144, 145 may be inserted all in a common axial line. This will represent three lines in which one beam 144 alternates with one beam 145, in a manner similar to the arrangement of FIG. 11. In FIG. 10, this would correspond to omitting the beams 145 since they would not be visible behind the beams 144.

For relatively tough or hard vegetation, however, the three axial lines of beams 144 may alternate, in radial direction, with similar three lines of beams 145. In this case, the angular relationship may be as shown in FIG. 11, or the beams 145 may be halfway between two lines of beams 144, and vice versa. The chopping and cutting of the vegetation will thus occur not only between the interpenetrating beams of the two rotors 120, 140, but also between neighboring, displaced beams 144, 145 of the same rotor 140.

In FIG. 12, the broken-line lodgment, behind cheek 141, is shown to be the mirror image of the solid-line set, before the same cheek. It will be understood that this is but an examplary embodiment, since both sets of lodgments may have the same direction. Also, it is considered to be within the scope of the invention to provide twin lodgments, on one or on both sides of each cheek, allowing thus to vary the positions of the beams 144 and/or 145.

It is understood that the shafts 143, held between neighboring pairs of lodgments 148, may be manually removed and re-arranged, according to the work to be performed with the harvester. The blades 167 may easily be swung open, as shown in FIG. 15, giving access for fast and simple re-arranging of the beams into continuous or discontinuous lines. This change-over or re-arrangement does, of course, not affect the rotor 120 which only has three continuous axial lines of beams 124.

The universal grinder and harvester according to this invention can be put to various uses, such as: (a) treatment of vegetals meant for feeding livestock; chopping, breaking up, ensilaging of various vegetals, such as hay or forage corn (maize); (b) cleaning up of soil after cultivation; cereal straw, corn stems after the ears have been removed; haulms of potatoes, collets of sugar-beets; and (c) elimination of parasitic vegetation: bushes, brushwood, brumbles, shoots of hedges; also, edges and sides of roads; undergrowth.

When the apparatus according to the invention is set into the horizontal position (e.g. as shown in FIG. 2), there is no need for an auxiliary wheel to obstruct the cutting line. The beams of the first rotor operate from top to bottom, in contradistinction to previously known harvesters fitted with similar rotors, working from the bottom toward the top. The angle at which the apparatus attacks the vegetation can be adjusted by changing the adjustment of bolt 53 with respect to slit 54 (see FIG. 18, for example).

By using the wheel 191, attachable in tube 188 (see FIG. 20), a free-floating angular position may be obtained, as shown in FIG. 19; this set-up is, of course, also suitable for horizontal terrain. The bolt 55 should be left untightened with respect to its slit 56 for this operation.

When the apparatus is set up for vertical operation, e.g. for ensilaging corn, it has been found that a rotor length of approx. 1.2 meter is well adapted to handle corn of up to 3 meters high. Such an apparatus has proven to handle 30,000 kilograms of corn per hour (with a 1.2 meter long rotor).

In the afore-mentioned embodiment of the inventive apparatus, the first and second rotors have respective diameters of 0.45 and 0.28 meter. Experiments have shown that parasitic vegetation and branches of up to 4 centimeters diameter have been handled without difficulty, chopping them up with a single stroke or cut into what may be called just "matchsticks." The driving tractor had an output of 30 horsepower. For most applications, 20 to 25 HP will be found sufficient.

The foregoing disclosure relates only to a preferred, exemplary embodiment of the invention, which is intended to include all changes and modifications of the example described within the scope of the invention as set forth in the appended claims.

What we claim is:

1. A Universal grinder and harvester comprising, in combination, drive means, at least two rotor means fixed in substantially parallel relation operatively connected for simultaneous rotation, means for tilting the axes of said rotor means between a substantially horizontal and a substantially vertical position, and means for varying the angle of attack of at least one of said rotor means, said tilting and said varying means each allowing an angular movement of at least 90 degrees, the movements of the aforementioned tilting and varying means being substantially at right angles with respect to each other.

2. A universal grinder and harvester according to claim 1, wherein said drive means includes a gearing for rotating one of said rotor means at a slower speed than the other rotor means, said one rotor means being larger in diameter than said other rotor means and being in first contact with the vegetation to be processed.

3. A universal grinder and harvester according to claim 2, wherein said rotor means rotate in the same sense, the speed of said other rotor means being at least three times that of said one rotor means.

4. A universal grinder and harvester according to claim 1, wherein at least one of said rotor means has radially protruding paddle members attached thereto for producing air movement during the operation of the harvester around said rotor means.

5. A universal grinder and harvester according to claim 1, wherein at least one of said rotor means has radially protruding beam members attached thereto for cutting and chopping the vegetation processed thereby.

6. A universal grinder and harvester according to claim 5, wherein said beam members are arranged in at least three axial rows, further comprising means for articulating each beam member with respect to the associated rotor means.

7. A universal grinder and harvester according to claim 6, wherein said beam members are arranged in a plurality of discontinuous rows, one beam member in one row axially alternating with another beam member in the adjacent row.

8. A universal grinder and harvester according to claim 5, further comprising arched grill means in front of said one rotor means.

9. A universal grinder and harvester according to claim 8, further comprising hinge means for said grill means, allowing access to said one rotor means when said grill means is swung aside.

10. A universal grinder and harvester according to claim 5, further comprising journaling means for said beam members, for holding the latter in place against centrifugal forces while allowing radial movement to said beam members toward the axis of the associated rotor means.

11. A universal grinder and harvester according to claim 10, further comprising means permitting angular pivoting of said beam members around said journaling means.

12. A universal grinder and harvester according to claim 5, further comprising elastic coupling means between said drive means and at least one of said rotor means.

13. A universal grinder and harvester according to claim 12, wherein said coupling means includes a driving member associated with said drive means and a driven member associated with said one rotor means, at least one of said members having fingers protruding therefrom into arcuate slots provided in the other member in concentric relationship therewith.

14. A universal grinder and harvester according to claim 13, wherein said coupling means further includes a resilient disc member having bores for said fingers and being interposed between said members.

15. A universal grinder and harvester according to claim 5, further comprising comb means between one of said rotor means and the vegetation to be processed.

16. A universal grinder and harvester according to claim 5, further comprising stationary deflector means in the region of one of said rotor means for directing the vegetation to be processed thereinto.

17. A universal grinder and harvester according to claim 5, wherein said drive means includes Cardan-type coupling means between the power output of a tractor to which the harvester is connected and the power input of said drive means.

18. A universal grinder and harvester according to claim 5, further comprising linkage means for attaching the harvester to a driving tractor, and means for adjustment of said linkage means in at least one direction.

19. A universal grinder and harvester according to claim 18, wherein said linkage means includes a three-point connection between the harvester and said tractor, allowing both vertical and horizontal adjustment therebetween.

20. A universal grinder and harvester according to claim 5, wherein both rotor means have beam members, the beam members of at least one rotor means having peripheral recesses therein for catching the vegetation therebetween.

21. A universal grinder and harvester according to claim 20, wherein the beam members of at least one rotor means also have peripheral projections therein for interpenetration with said recesses during the rotation of said rotor means.

22. A universal grinder and harvester according to claim 21, further comprising lodgment means on said rotor means for journaling the respective beam members in a pivotable and radially movable manner.

23. A universal grinder and harvester according to claim 22, wherein said lodgment means include each a half-collar into which the respective beam member is fitted with an axially protruding shaft portion thereof.

24. A universal grinder and harvester according to claim 23, wherein said rotor means include cheek plates for supporting said lodgment means.

25. A universal grinder and harvester according to claim 24, wherein the number of said cheek plates exceeds that of the associated beam members in said rotor means by one.

26. A universal grinder and harvester according to claim 5, further comprising detachable wheel means for supporting said rotor means when said tilting means is in a position other than said vertical position.

27. A universal grinder and harvester according to claim 26, further comprising swivable hood means attached to the output side of one of said rotor means for discharging the vegetation chopped with the harvester.

28. A universal grinder and harvester according to claim 27, wherein said hood means include a terminal discharge tube and a collar interposed between said one rotor means and said discharge tube, means being provided for adjusting the relative position of said collar and said discharge tube with respect to the harvester.

29. A universal grinder and harvester comprising, in combination, first rotor means in contact with the vegetation to be processed, second rotor means in adjacent and substantially parallel relationship to said first rotor means, drive means for rotating said rotor means in the same direction but at different speeds, said rotor means having radially protruding paddle members and beam members substantially intermediate said paddle members, peripheral portions of said beam members having complementary recesses and protrusions in said rotor means for mutual interpenetration during their rotation, at least one of said rotor means having journalling means thereon for selective attachment of the respective beam members in at least three axial lines.

30. A universal grinder and harvester according to claim 29, wherein said drive means includes gear members for rotating said one rotor means with a speed at least half of that of the other rotor means while providing greater inertia for processing said vegetation.

31. A universal grinder and harvester according to claim 30, wherein said journaling means includes half-collars and resilient means for urging said half-collars radially outwardly from the axis of said one rotor means, the respective beam members having shaft-like protrusions pivotally engaged in said half-collars.

32. A universal grinder and harvester according to claim 31, wherein said half-collars are arranged in adjacent pairs allowing selective attachment of the respective beam members in axially alternating set-up between subsequent half-collar pairs along the axis of said one rotor means.

References Cited

UNITED STATES PATENTS

| | | | |
|---|---|---|---|
| 2,505,023 | 4/1950 | Williamson | 146—107 |
| 2,575,380 | 11/1951 | Borton | 241—194 |
| 2,634,570 | 4/1953 | Brockman et al. | 56—504 X |
| 2,743,567 | 5/1956 | Martin | 56—6 |
| 3,121,987 | 2/1964 | Harris | 56—504 |

ABRAHAM G. STONE, *Primary Examiner.*

P. A. RAZZANO, *Assistant Examiner.*